Sept. 20, 1932.  H. A. SHAPIRO ET AL  1,877,997
VEHICLE BACKING MIRROR APPARATUS
Filed Feb. 6, 1930
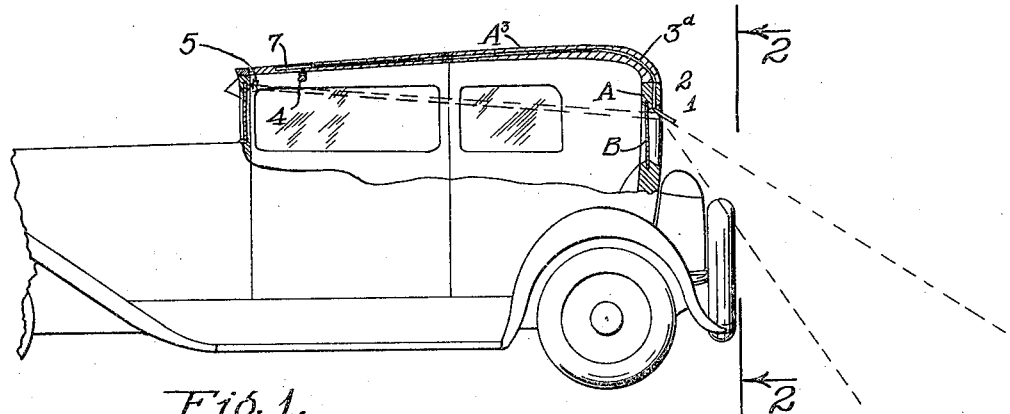
Fig. 1.
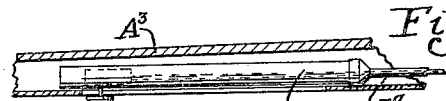
Fig. 5.
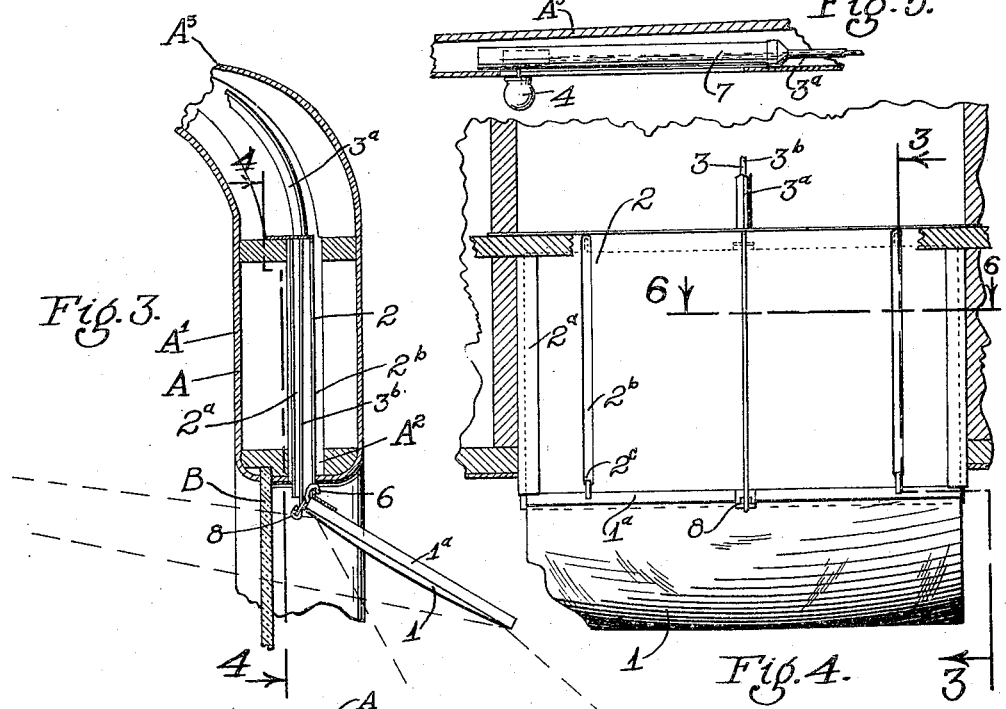
Fig. 3.
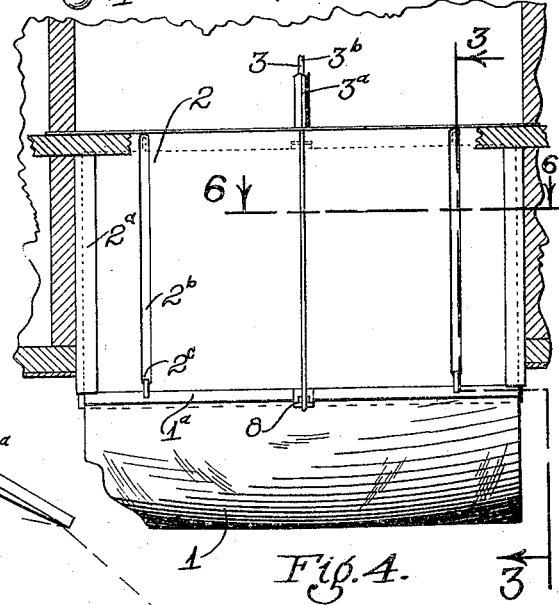
Fig. 4.
Fig. 6.
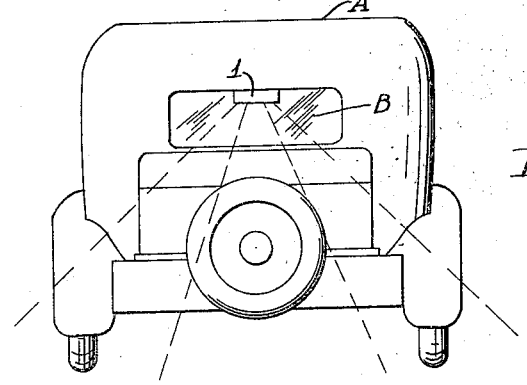
Fig. 2.
INVENTORS
HYMAN A. SHAPIRO
PAUL FRAUENDORF
BY A. B. Bowman
ATTORNEY Patented Sept. 20, 1932

1,877,997

UNITED STATES PATENT OFFICE

HYMAN A. SHAPIRO, OF LOS ANGELES, AND PAUL FRAUENDORF, OF CULVER CITY, CALIFORNIA

VEHICLE BACKING MIRROR APPARATUS

Application filed February 6, 1930. Serial No. 426,220.

Our invention relates to a vehicle backing mirror apparatus, particularly adapted for vehicles in which the operator cannot see the rear end of the vehicle or the portion of the roadway or space immediately behind the rear end of the vehicle.

The objects of this invention are: First, to provide an apparatus of this class for automobiles, trucks, stages, or other vehicles, in which the operator of the vehicle is located at the forward portion of the vehicle or in such a position that he has a clear view of the roadway at the front of the vehicle, whereby the operator, while located in such position for normally operating the vehicle in a forward direction, may see a considerable portion of the roadway, or driveway, or other space, immediately at the rear end of the vehicle and a considerable space to either side at the rear end of the vehicle so that the operator before or when backing up the vehicle, as when backing from a garage or parking place, or when parking the car or vehicle, can see whether the rear is clear before or when backing up, thus providing means for avoiding many of the accidents or injury to persons, automobiles or other property; second to provide an apparatus of this class in combination with the usual rear sight mirror at the forward portion of the vehicle whereby the space immediately at the rear of the vehicle may be seen in addition to the roadway or space considerable distances to the rear, for which such rear sight mirrors are adapted, thus confining the operator's vision to one spot for taking in visually substantially the whole of the space or roadway at the rear of the vehicle; third, to provide an apparatus of this class in which a relatively large mirror is positioned at an angle at the rear end of the vehicle whereby a relatively large area immediately at the rear end of the vehicle may be reflected toward the forward end of the vehicle; fourth, to provide an apparatus of this class in which such mirror at the rear end of the vehicle may be readily shifted from its operative position into an out of the way position when not in use, and which, when shifted in its out of the way position, is concealed from view and retained in a space or recess within the contour of the vehicle or within the walls thereof; fifth, to provide such a mirror at the rear end of the vehicle which may be readily shifted to various angles by the operator in the driver's compartment of the vehicle, when desiring to shift the field of vision at the rear end of the vehicle; sixth, to provide a novel mounting for a mirror at the rear end of the vehicle whereby the same may be supported in a substantially concealed out of the way position when not in use, and whereby, when the mirror is shifted to its operative position, may be titled at the desired angle for viewing the space or roadway immediately at the rear end of the vehicle; seventh, to provide novel means for shifting and controlling the position of such mirror from the operator's compartment of the vehicle, and which means may be enclosed within the top and walls of the vehicle body; eighth, to provide as a whole a novelly constructed and operated vehicle backing mirror apparatus; and, ninth, to provide an apparatus of this class which is very simple and economical of construction, durable, flexible, which may be readily installed on or applied to vehicles now in use, and an apparatus which is easily operated and which will not readily deteriorate or get out of order.

With these and other objects in view our invention consists of certain novel features of construction, combination and arrangement of parts and portions, as will be hereinafter described in detail and particularly set forth in the appended claims, reference being had to the accompanying drawing and to the characters of reference thereon which form a part of this application in which:

Figure 1 is a fragmentary side view of a common type of enclosed automobile incorporating our vehicle backing mirror apparatus in one form; Fig. 2 is a rear end view of the automobile showing the rear mirror in operative position and showing by dash lines the lateral extent of the field of vision; Fig. 3 is an enlarged sectional elevational view of the rear end of the vehicle body at the upper portion of the rear window on a longitudinal vertical plane through the body, as indicated by 3—3 of Fig. 4, showing the portion of our apparatus in one form at the rear of the vehicle; Fig. 4 is a fragmentary partial sectional and partial elevational view thereof taken through 4—4 of Fig. 3; Fig. 5 is an enlarged longitudinal sectional view through the front portion of the top of the vehicle, showing one form of control means of our apparatus in a position readily accessible by the operator, and Fig. 6 is a fragmentary sectional view of our apparatus taken through 6—6 of Fig. 4.

Like characters of reference refer to similar parts and portions throughout the views of the drawings.

The embodiment of our invention, as shown in the drawings, consists of a rear mirror 1, a supporting frame 2, a Bowden cable 3, an operating knob 4, and a rear sight mirror 5.

The automobile shown is an enclosed automobile—a sedan—of common type having a body A and a window B at its rear end. The frame 2 of our apparatus, as disclosed, is located in the back wall A1 of the body A in a vertical recess A2 immediately behind the rear window B and upwardly from the upper portion of the window. The support 2, in this instance, consists of a sheet metal plate having vertical channels 2a at the inner sides of its lateral edges, and having also vertical slots 2b in the plate spaced inwardly from the lateral edges of the plate. This support 2 forms the rear wall of the recess A2 and supports and positions at the front side thereof the mirror 1 when the latter is drawn into the recess, as will be described hereafter.

The channels 2a and the slots 2b form guides for the shifting of the mirror 1 into and out of the recess or relative to the support, the lateral edges of the mirror 1 fitting into the channels 2a. At the upper portion of the frame 1a of the mirror 1 are provided hooks 6 which, when the mirror is positioned in the recess, extend backwardly through the vertical slots 2b. When the mirror is forced from the recess and before it is shifted to operative position, as shown by solid lines in Fig. 3, the hooks 6 engage the lower ends of the slotted portions. These lower ends of the slotted portions, designated 2c, form stops and also pivot means for limiting, respectively, the downward position of the mirror 1, as well as forming means about which the mirror 1 may be pivoted or tilted to an angular position, as shown in Fig. 3. The means for shifting and for controlling the position of the mirror 1, consists in this instance of a Bowden cable 3, comprising a tube 3a and a wire 3b. The tube 3a extends upwardly from the support 2 within the back wall A1 of the body, as shown in Fig. 3, and then forwardly through the top A3 and terminates, in this instance, at the forward portion of the body immediately above the driver's head, or at a location readily accessible by him. To the front end of the tube 3a is connected a tubular guide 7 which extends longitudinally of the vehicle and is open or slotted at its under side. The wire 3b of the Bowden cable is pivotally connected at its rear end to lugs 8 secured to the normally upper portion of the mirror frame 1a and extending to the side thereof opposite the hooks 6. These lugs or arms 8 form levers for tilting the mirror 1 about the pivots or stops 2c when the latter are engaged by the hooks 6. This wire 3b extends through the tube 3a and terminates in the guide 7. To the forward end of the wire is fixedly connected the knob 4, or other suitable means, which is slidable on the guide 7 and extends downwardly therefrom and is readily accessible by the operator of the vehicle. The wire 3b is also so connected to the mirror 1 that when the mirror is in a vertical position, the wire draws the mirror into the recess or forces it therefrom.

The mirror 1 is preferably a convex mirror—a portion of a sphere—so that a relatively large ground area at the rear end of the vehicle may be seen from the forward portion of the vehicle when the mirror 1 is positioned at an angle substantially as shown in Figs. 1 and 3, the area capable of being viewed varying with the curvature of the mirror 1 and its distance from the eye of the operator.

The operator may look directly into the mirror 1, but the preferable method is the use of the mirror 1 in combination with the conventional rear sight mirror 5 in front of the operator. When looking into the rear sight mirror 5, the driver views simultaneously the roadway in the rear a considerable distance from his vehicle for the approach of other vehicles, and simultaneously, or without redirecting his vision, he may view the space immediately at the rear of the vehicle to determine the condition thereof and to determine whether any persons or objects are in his way. The latter feature is primarily desirable when backing from garages, or parking places, and also when parking a vehicle on the roadside or other parking place where there are other vehicles.

The position of the mirror 1, shown by solid lines in Figs. 1 and 3, is the ordinary operative position of our apparatus and, in the position shown, the objects of the space behind the vehicle are reflected through the rear window of the body of the automobile to the rear sight mirror 5. When the mirror 1 is not in use, the same may be readily shifted out of the way by merely throwing the knob 4 forwardly or by shifting any other actuating means.

It will be here noted that the curvature of the mirror 1 is dependent to a large extent upon its distance from the rear sight mirror 5, the curvature increasing (that is the radius decreasing) as the distance from the rear sight mirror 5 is increased.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In an apparatus of the class described, the combination with a vehicle having a window at the rear end, a convex mirror mounted at the rear end of the vehicle at the upper portion of the window and directed downwardly and backwardly from the vehicle, a rear sight mirror mounted at the forward portion of the vehicle from which the images on the first mirror may be seen through said rear window, and manual means at the forward portion of the automobile for shifting the convex mirror from an inoperative position into view when desired so that reflected images can be seen thereby.

2. In an apparatus of the class described, the combination with a vehicle, having a window at the rear end, a mirror mounted at the rear end of the vehicle at the upper portion of the window and directed downwardly and backwardly from the vehicle, a rear sight mirror mounted at the forward portion of the vehicle from which the images on the first mirror may be seen through said rear window, the body of the vehicle having a vertical opening extending upwardly from the rear window, and means for drawing the first mirror into said opening.

3. In an apparatus of the class described, the combination with a vehicle, having a window at the rear end, a mirror mounted at the rear end of the vehicle at the upper portion of the window and directed downwardly and backwardly from the vehicle, a rear sight mirror mounted at the forward portion of the vehicle from which the images on the first mirror may be seen through said rear window, the body of the vehicle having a vertical opening extending upwardly from the rear window, and means for drawing the first mirror into said opening, said means comprising a Bowden cable located in the top of the vehicle and extending from the first mirror to the operator's compartment of the vehicle.

4. In an apparatus of the class described, a vehicle body having a vision opening in its rear wall, and a substantially vertical recess in said rear wall above said vision opening, guide means in said recess, and a mirror mounted on said guide means and adapted to be drawn into said recess, said mirror, when withdrawn from the recess, being directed backwardly and downwardly with its reflecting side disposed downwardly and forwardly.

5. In an apparatus of the class described, a vehicle body having a vision opening in the rear wall, and a substantially vertical recess in said rear wall above said vision opening, guide means in said recess, a mirror mounted on said guide means and adapted to be drawn into said recess, said mirror, when withdrawn from the recess, being directed backwardly and downwardly with its reflecting side disposed downwardly and forwardly, and means at the forward portion of the vehicle body for forcing said mirror into and from said recess.

6. In an apparatus of the class described, a vehicle body having a vision opening in the rear wall, and a substantially vertical recess in said rear wall above said vision opening, guide means in said recess, a mirror mounted on said guide means and adapted to be drawn into said recess, said mirror, when withdrawn from the recess, being directed backwardly and downwardly with its reflecting side disposed downwardly and forwardly, a Bowden cable secured to the mirror through the recess and mounted in the top of the vehicle body and extending with its forward end into the operator's compartment of the vehicle, and means at the forward end of the Bowden cable to facilitate the shifting of the same for forcing said mirror into and from said recess.

7. In an apparatus of the class described, a vehicle body having a vision opening in the rear wall, and a substantially vertical recess in said rear wall above said vision opening, guide means in said recess, a mirror mounted on said guide means and adapted to be drawn into said recess, said mirror, when withdrawn from the recess, being directed backwardly and downwardly with its reflecting side disposed downwardly and forwardly, and a rear sight mirror mounted at the forward portion of the vehicle body and disposed with its reflecting surface to the rear, the images directed upon the first mirror being seen by looking into the second mirror.

8. In an apparatus of the class described, the combination with a vehicle body, of a substantially vertical support at the rear portion of the vehicle body and provided therein with vertical guides, a mirror frame having guide portions at its normally upper portion, said guide portion being mounted on the guides of the support, there being provided stop portions at the lower ends of the guide means, there being provided at the upper portion of the mirror frame a forwardly extending arm, means connected to said arm for drawing said frame upwardly and downwardly on said guides and for tilting the same backwardly about said stops, said frame when drawn upwardly, being positioned in front of the support, and a mirror mounted on the mirror frame with its reflecting surface disposed forwardly and downwardly when the mirror frame is in its lower position.

9. In an apparatus of the class described, the combination with a vehicle body, of a substantially vertical support at the rear portion of the vehicle body and provided therein with vertical guides, a mirror frame having guide portions at its normally upper portion, said guide portion being mounted on the guides of the support, there being provided stop portions at the lower ends of the guide means, there being provided at the upper portion of the mirror frame a forwardly extending arm, means connected to said arm for drawing said frame upwardly and forwardly on said guides and for tilting the same backwardly about said stops, said frame when drawn upwardly, being positioned in front of the support, and a mirror mounted on the mirror frame with its reflecting surface disposed forwardly and downwardly when the mirror frame is in its lower position, said means for raising and lowering said frame comprising a Bowden cable connected at one end to said arm and extending with its other end adjacent the driver's compartment of the vehicle.

10. In an apparatus of the class described, the combination with a vehicle body, of a substantially vertical support at the rear portion of the vehicle body and provided therein with vertical guides, a mirror frame having guide portions at its normally upper portion, said guide portion being mounted on the guides of the support, there being provided stop portions at the lower ends of the guide means, there being provided at the upper portion of the mirror frame a forwardly extending arm, means connected to said arm for drawing said frame upwardly and downwardly on said guides and for tilting the same backwardly about said stops, said frame when drawn upwardly, being positioned in front of the support, a mirror mounted on the mirror frame with its reflecting surface disposed forwardly and downwardly when the mirror frame is in its lower position, and a second mirror located at the forward portion of the vehicle body and disposed with its reflecting surface to the rear.

11. In an apparatus of the class described, the combination with a vehicle body, of guide means conforming substantially with the contour of the body, a mirror having at one edge guide portions shiftably mounted in the guides, said guide means having pivot means at the lower portions thereof for receiving and pivotally supporting the guide portions of the mirror when the guide portions are shifted to the lower ends of the guides, and means for forcing the guide portions of the mirror along the guides and for tilting the same relative thereto, said mirror, when shifted to its tilted position, being directed backwardly at an angle with the vehicle.

In testimony whereof, we have hereunto set our hands at Los Angeles, California, this 27th day of January 1930.

HYMAN A. SHAPIRO.
PAUL FRAUENDORF.